(12) United States Patent  
Sato

(10) Patent No.: US 8,717,471 B2  
(45) Date of Patent: May 6, 2014

(54) SOLID-STATE IMAGING DEVICE APPLIED TO CMOS IMAGE SENSOR

(75) Inventor: Maki Sato, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 91 days.

(21) Appl. No.: 12/980,852

(22) Filed: Dec. 29, 2010

(65) Prior Publication Data

US 2011/0221941 A1    Sep. 15, 2011

(30) Foreign Application Priority Data

Mar. 11, 2010   (JP) ................................. 2010-054912

(51) Int. Cl.
*H04N 3/14*   (2006.01)
*H04N 5/335*  (2011.01)

(52) U.S. Cl.
USPC ........................................ 348/294; 348/308

(58) Field of Classification Search
USPC ................. 348/302, 308, 294, 313, 315, 320;
250/208.1; 257/291, 292, 294, 440, 257/443–448
See application file for complete search history.

(56) References Cited

U.S. PATENT DOCUMENTS

| | | | |
|---|---|---|---|
| 2002/0180875 A1* | 12/2002 | Guidash | 348/280 |
| 2004/0108525 A1* | 6/2004 | Sekine | 257/202 |
| 2005/0185073 A1* | 8/2005 | Watanabe | 348/294 |
| 2008/0284882 A1* | 11/2008 | Mori et al. | 348/294 |

FOREIGN PATENT DOCUMENTS

| | | |
|---|---|---|
| JP | 2004-215048 | 7/2004 |
| JP | 2006-210468 | 8/2006 |
| JP | 2006-302970 | 11/2006 |

OTHER PUBLICATIONS

Mitsuyoshi Mori, et al., "A ¼in 2M Pixel CMOS Image Sensor with 1.75 Transistor/Pixel", ISSCC 2004, Session 6, Imaging, 6.2; 2004 IEEE International Solid-State Circuits Conference, Feb. 2004, 4 pages.

Japanese Office Action issued May 29, 2012, in Japan Patent Application No. 2010-054912 (with English translation).

* cited by examiner

*Primary Examiner* — Lin Ye
*Assistant Examiner* — Mekonnen Dagnew
(74) *Attorney, Agent, or Firm* — Oblon, Spivak, McClelland, Maier & Neustadt, L.L.P.

(57) ABSTRACT

According to one embodiment, a solid-state imaging device includes a pixel array, two signal lines and a row scanning circuit. The row scanning circuit simultaneously renders conductive, by the first read-out row scanning circuit and the second read-out row scanning circuit, the two transfer transistors, which are connected to two photoelectric conversion elements do not share a floating diffusion portion neighboring in the column direction, thereby reading out signals in parallel from the photoelectric conversion elements of the pixels of two rows of an odd-numbered row and an even-numbered row.

12 Claims, 5 Drawing Sheets

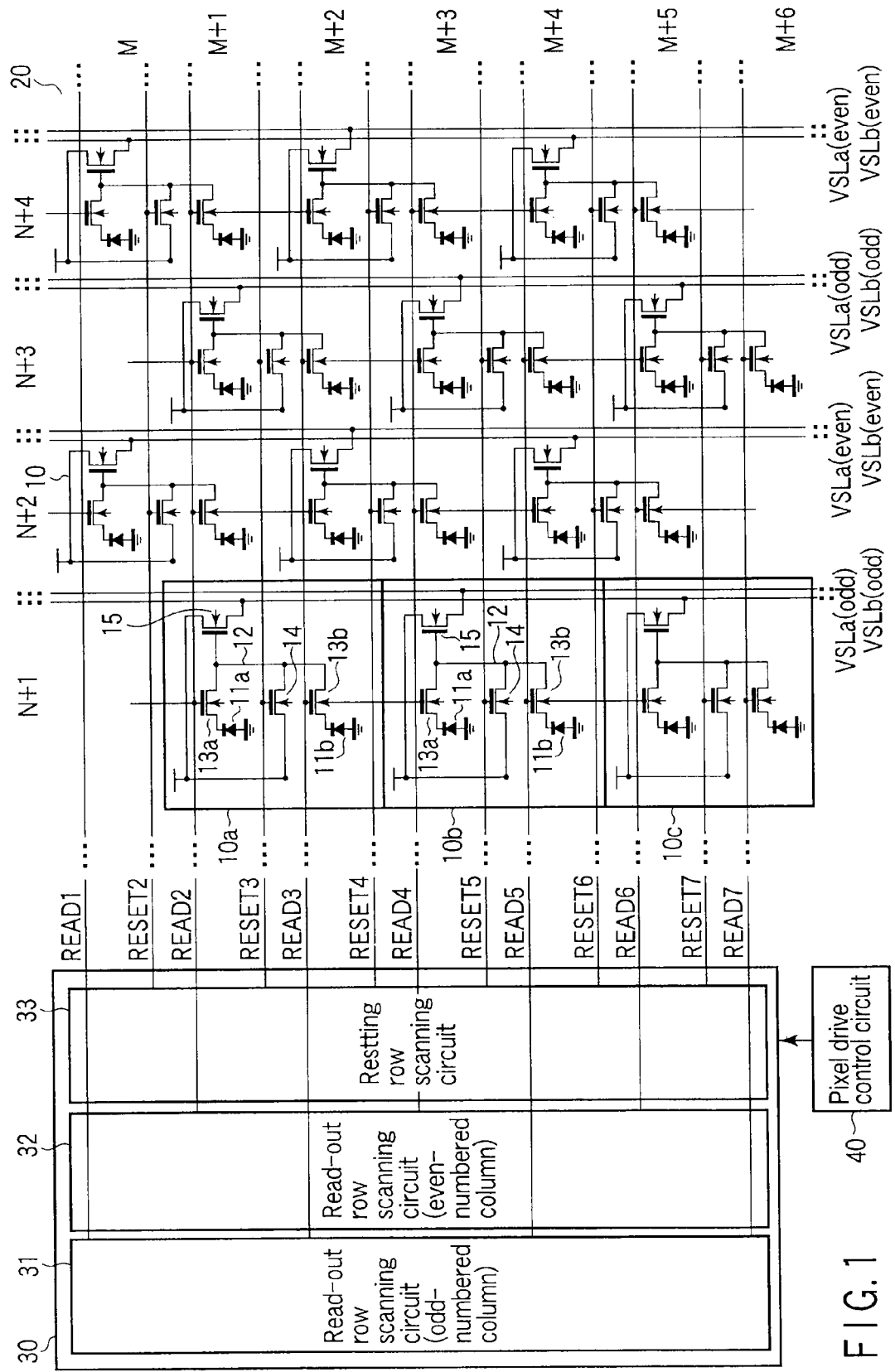
F I G. 1

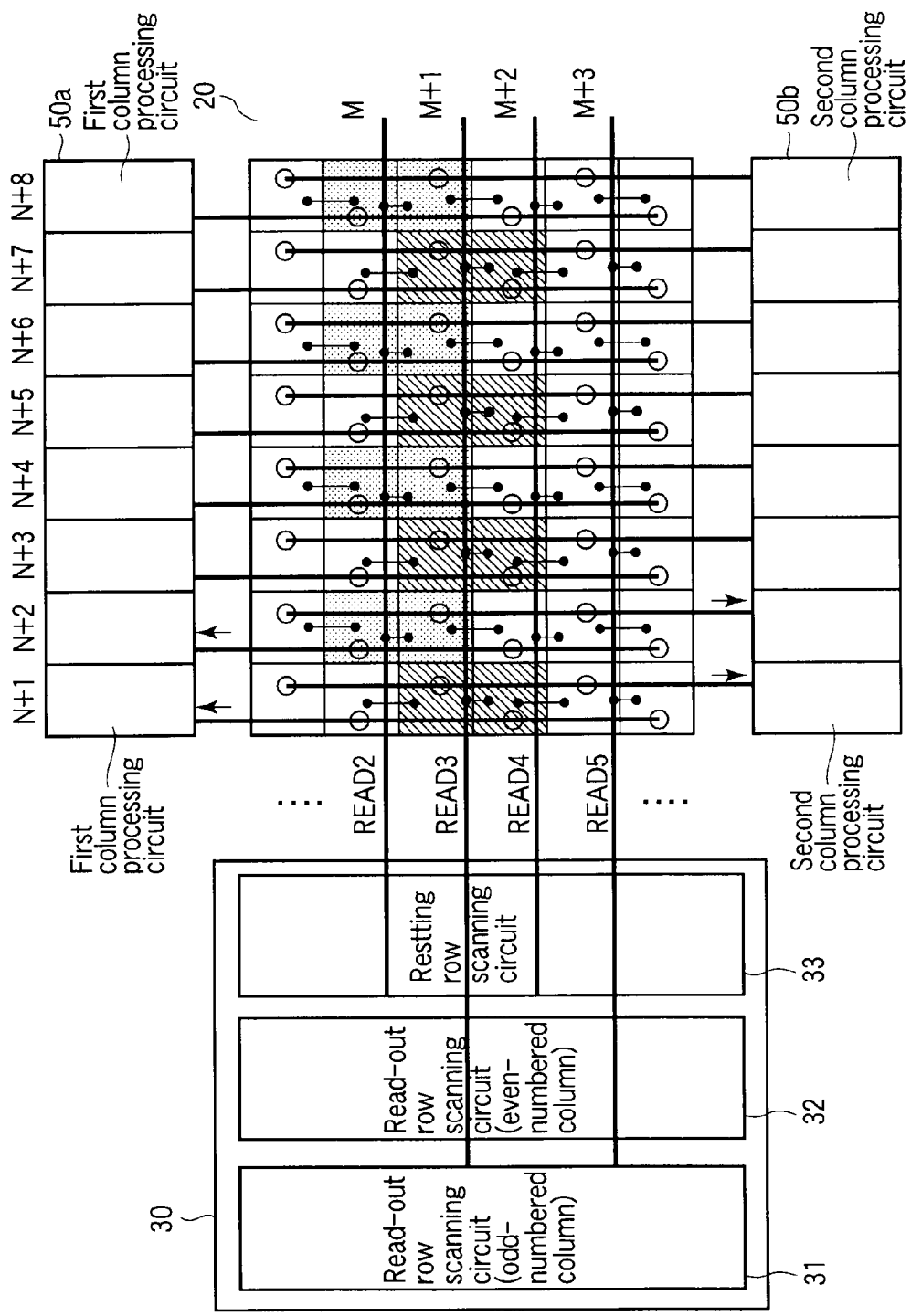
F I G. 4

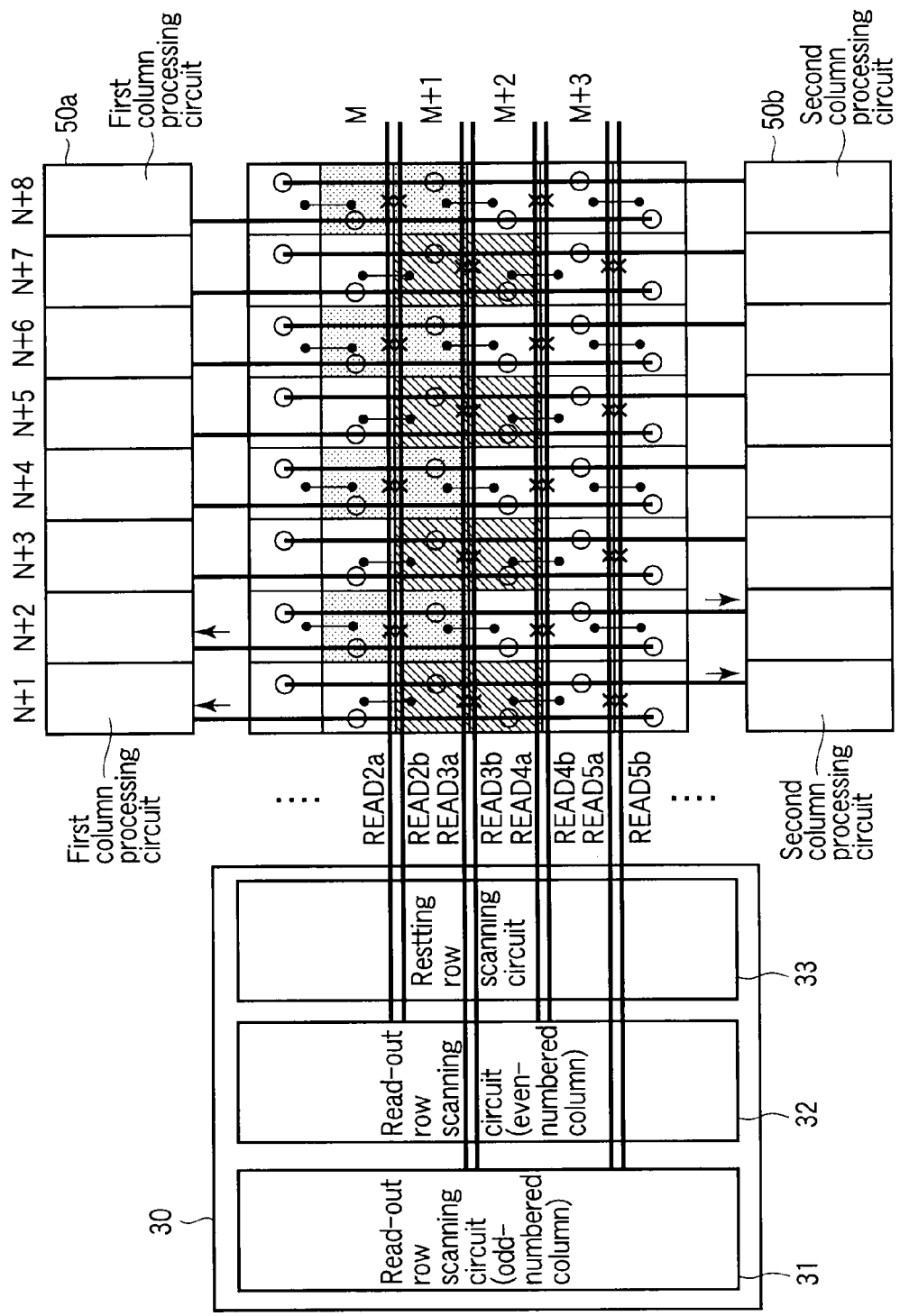
F I G. 5

US 8,717,471 B2

SOLID-STATE IMAGING DEVICE APPLIED TO CMOS IMAGE SENSOR

CROSS-REFERENCE TO RELATED APPLICATIONS

This application is based upon and claims the benefit of priority from Japanese Patent Application No. 2010-054912, filed Mar. 11, 2010; the entire contents of which are incorporated herein by reference.

FIELD

Embodiments described herein relate generally to a solid-state imaging device, for example, a signal read circuit of a CMOS image sensor.

BACKGROUND

The reduction in pixel pitch in a CMOS image sensor has been advanced for various reasons. In order to reduce the pixel pitch, pixels are arranged in a diced (staggered) fashion, and a plurality of photoelectric conversion elements (photodiodes) share an output circuit comprising a reset transistor and an amplifying transistor (hereinafter referred to as "pixel sharing"). Furthermore, a select transistor is dispensed with. In order to reduce the pixel pitch, other measures have been taken.

The pixel arrangement of the CMOS sensor, in which the above-described pixel sharing is implemented and CMOS image sensors are disposed in a diced fashion, is equal to an arrangement of repetitive units in which conventional Bayer-arranged color filters of three primary colors (R, G, B) are disposed in units of four pixels of 2×2. Thus, no periodical irregularity occurs due to a difference in repetitive arrangement. Specifically, two G pixels (Gr, Gb) in the Bayer arrangement are disposed in a diced fashion, like the pixel arrangement. Thus, the layout of the G pixels (Gr, Gb) is the same as the layout of the pixel arrangement, and no irregularity occurs due to the arrangement of the two G pixels. It is known, therefore, that the variance in fabrication can be suppressed, exact color signals can be output in accordance with images, and exact image color signals can be sent to a rear-stage color signal processing circuit.

BRIEF DESCRIPTION OF THE DRAWINGS

FIG. 1 is a circuit diagram of a CMOS image sensor according to a first embodiment.

FIG. 4 is a block diagram illustrating the flow of read-out signals in the CMOS image sensor shown in FIG. 1, together with respective pixels in a case where two-row simultaneous read-out is executed, and column processing circuits which process signals which are read out from the respective pixels and are each transferred via two vertical signal lines.

FIG. 5 is a block diagram illustrating the flow of read-out signals in a CMOS image sensor according to a second embodiment, together with respective pixels in a case where two-row simultaneous read-out is executed, and a column processing circuit which processes signals which are read out from each pixel and are each transferred via two vertical signal lines.

DETAILED DESCRIPTION

Figure 2:
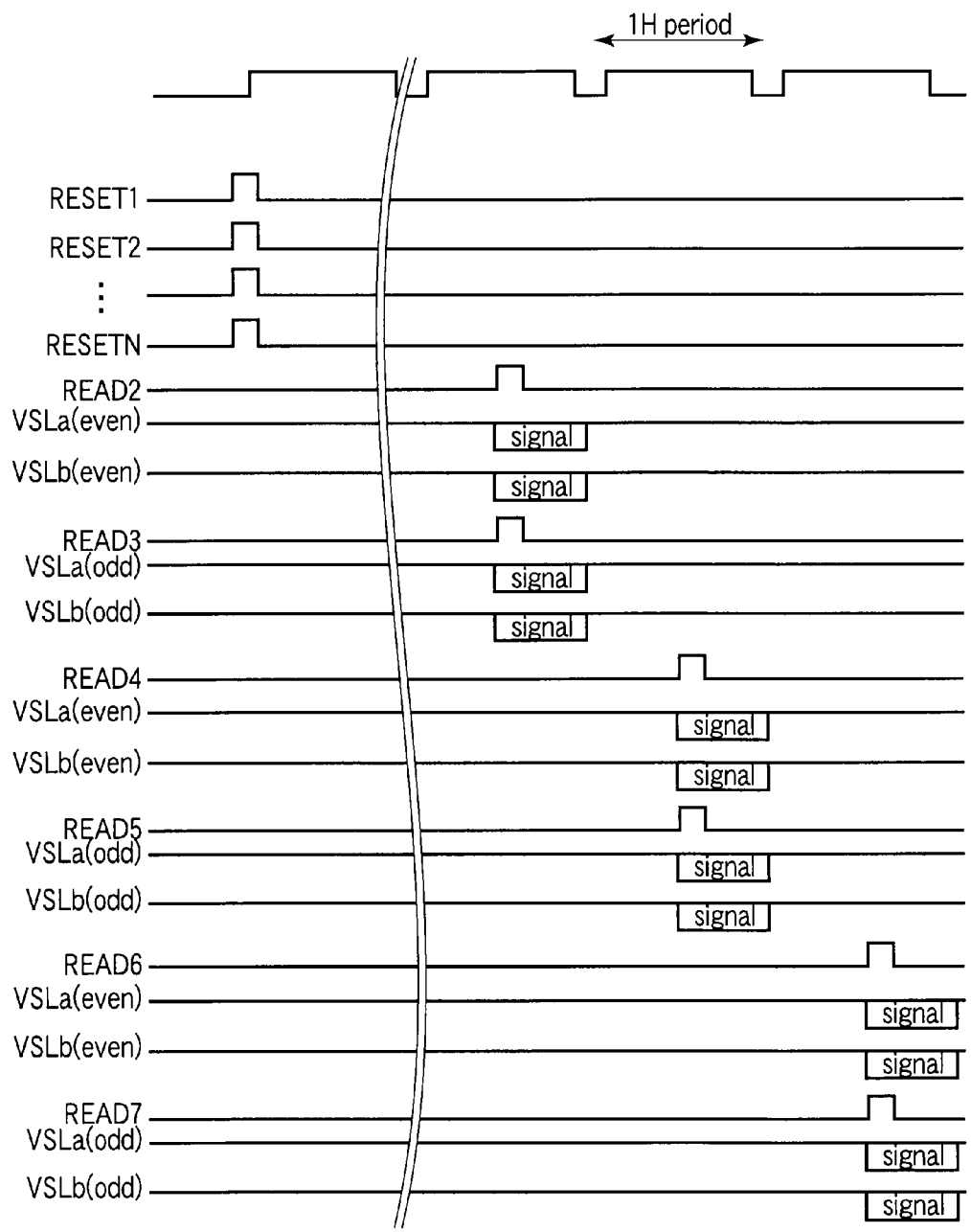
FIG. 2 is a timing chart illustrating an example of an operation in a case where read-out is executed by simultaneously selecting two rows of pixels in the pixel array in FIG. 1 at a time of a global shutter operation.

In general, according to one embodiment, a solid-state imaging device includes a pixel array, two signal lines and a row scanning circuit. In the pixel array, a plurality of rows of pixels are arranged such that the pixels included in an odd-numbered column and the pixels included in an even-numbered column are displaced by a half pitch in a column direction. Each of the pixels includes two photoelectric conversion elements, two transfer transistors which are connected to the two photoelectric conversion elements, and an output circuit which is shared by the two photoelectric conversion elements. The two signal lines are provided in association with each of the pixels of the odd-numbered column and the even-numbered column, the two signal lines being configured to transfer signals which are read out of the photoelectric conversion elements in each of columns of the pixels. The row scanning circuit includes a first read-out row scanning circuit for accessing the pixels of the odd-numbered column and a second read-out row scanning circuit for accessing the pixels of the even-numbered column. The row scanning circuit simultaneously renders conductive, by the first read-out row scanning circuit and the second read-out row scanning circuit, the two transfer transistors, which are connected to two photoelectric conversion elements do not share a floating diffusion portion neighboring in the column direction, thereby reading out signals in parallel from the photoelectric conversion elements of the pixels of two rows of an odd-numbered row and an even-numbered row.

In the meantime, a CMOS image sensor has been thought, wherein at a time of all-pixel read mode in which pixel sharing is implemented and signals are read out from all pixels, two-row simultaneous read is executed by simultaneously reading signals from two photoelectric conversion elements which do not implement pixel sharing. By executing the two-row simultaneous read, the time that is needed for reading signals from all pixels can be reduced, and the read time can be reduced to ½ of a normal frame rate.

In the CMOS image sensor which implements the pixel sharing, when two-row simultaneous read is executed, it is necessary to prevent mixing of pixel signals. To achieve this, signals have to be transferred from different photoelectric conversion elements to floating diffusion parts in different pixels, and signals have to be output to different vertical signal lines. However, in the case where pixels are arranged in a diced fashion, such a disadvantage arises that two-row simultaneous read cannot be executed at the time of all-pixel read mode. Therefore, there is a demand for realization of two-row simultaneous read.

FIG. 1 is a circuit diagram of a CMOS image sensor according to a first embodiment. The CMOS image sensor includes a pixel array 20, a row scanning circuit 30 and a pixel drive control circuit 40. In the pixel array 20, a plurality of unit pixels 10 are arranged in a row direction and a column direction. The row scanning circuit 30 executes row selection. The pixel drive control circuit 40 supplies timing signals to a column select circuit (not shown) and the row scanning circuit 30, and controls the operations thereof.

In the pixel array 20, pixel sharing is implemented between pixels neighboring in the column direction. In the plurality of unit pixels 10, the pixels in an odd-numbered column and the pixels in an even-numbered column are displaced by a half pitch in the column direction and are arranged in a diced fashion.

Each unit pixel 10 comprises two photodiodes 11a and 11b which function as photoelectric conversion elements; transfer transistors 13a and 13b which are connected to the two photodiodes 11a and 11b and transfer signal charges of the two photodiodes 11a and 11b to a floating diffusion part 12; and an output circuit shared by the two photodiodes 11a and 11b.

The output circuit includes a reset transistor 14 and an amplifying transistor 15. The source/drain of the reset transistor 14 is inserted and connected between a pixel power supply node PPN and the floating diffusion part 12. The control gate of the amplifying transistor 15 is connected to the floating diffusion part 12, and the source/drain of the amplifying transistor 15 is connected at one end to the pixel power supply node PPN.

The control gates of two transfer transistors 13a and 13b, which are connected to two photodiodes of the four photodiodes in two unit pixels 10 neighboring in the column direction, which two photodiodes neighbor between the pixels, are mutually connected. For example, the control gates of the two transfer transistors 13b and 13a, which are connected to two photodiodes 11b and 11a of the four photodiodes of a unit pixel 10a of an odd-numbered column shown at the left end side of the pixel array 20 and a unit pixel 10b neighboring the unit pixel 10a in the column direction, which two photodiodes 11b and 11a neighbor between the pixels, are mutually connected. Specifically, the control gate of the transfer transistor 13b, which is connected to the photodiode 11b of the unit pixel 10a, and the control gate of the transfer transistor 13a, which is connected to the photodiode 11a of the unit pixel 10b, are connected.

Similarly, the control gates of the two transfer transistors 13b and 13a, which are connected to two photodiodes 11b and 11a of the four photodiodes of the unit pixel 10b and a unit pixel 10c which neighbors the unit pixel 10b in the column direction, which two photodiodes 11b and 11a neighbor between the pixels, are mutually connected.

In the pixel array 20, two vertical signal lines VSLa and VSLb are provided in association with each pixel column. The two vertical signal lines VSLa and VSLb of each odd-numbered column (N+1, N+3, . . . ) are indicated by VSLa (odd) and VSLb (odd), and the two vertical signal lines VSLa and VSLb of each even-numbered column (N+2, N+4, . . . ) are indicated by VSLa (even) and VSLb (even).

The other ends of the source/drain of the amplifying transistors 15 in the unit pixels 10, which are disposed on odd-numbered rows (M+1, M+3, . . . ) and even-numbered rows (M, M+2, . . . ), are alternately connected to each two vertical signal lines VSLa an VSLb. Further, a plurality of read control lines READi (i=1, 2, 3, . . . ) and a plurality of reset control lines RESETi are provided in the pixel array 20. The read control lines READi are divided into read control lines (READ1, READ3, READ5, . . . ) for selecting pixels of odd-numbered columns (N+1, N+3, . . . ) and read control lines (READ2, READ4, READ6, . . . ) for selecting pixels of even-numbered columns (N+2, N+4, . . . ). The read control lines READ1, READ3, READ5, . . . , for selecting pixels of odd-numbered columns (N+1, N+3, . . . ) are commonly connected to the control gates of the transfer transistors 13a, 13b in the pixels disposed on the odd-numbered columns. The read control lines READ2, READ4, READ6, . . . , for selecting pixels of even-numbered columns (N+2, N+4, . . . ) are commonly connected to the control gates of the transfer transistors 13a, 13b in the pixels disposed on the even-numbered columns.

Similarly, the reset control lines RESETi are divided into reset control lines (RESET1, RESET3, RESET5, . . . ) for selecting pixels of odd-numbered columns (N+1, N+3, . . . ) and reset control lines (RESET2, RESET4, RESET6, . . . ) for selecting pixels of even-numbered columns (N+2, N+4, . . . ). The reset control lines RESET1, RESET3, RESET5, . . . , for selecting pixels of odd-numbered columns (N+1, N+3, . . . ) are commonly connected to the control gates of the reset transistors 14 in the pixels disposed on the odd-numbered columns. The reset control lines RESET2, RESET4, RESET6, . . . , for selecting pixels of odd-numbered columns (N+2, N+4, . . . ) are commonly connected to the control gates of the reset transistors 14 in the pixels disposed on the even-numbered columns.

The row scanning circuit 30 is configured to drive the read control lines READi and reset control lines RESETi and select pixels on a row-by-row basis. The row scanning circuit 30 comprises a read-out row scanning circuit 31 for accessing pixels of odd-numbered columns, a read-out row scanning circuit 32 for accessing pixels of even-numbered columns, and a resetting row scanning circuit 33 for odd-numbered columns and even-numbered columns.

Although not shown, transistors for current supply are connected between each two vertical signal lines VSLa, VSLb and a ground, and column processing circuits for processing read signals, which flow in the vertical signal lines VSLa, VSLb, are provided on the upper end side and lower end side of the pixel array 20. The column processing circuit includes, for example, a correlated double sampling (CDS) circuit, an AD conversion circuit, a horizontal shift register, etc. In addition, in FIG. 1, an uppermost pixel row in the vertical direction in the pixel array 20 is referred to as an M row for the purpose of convenience, and subsequent pixel rows are referred to as an M+1 row, an M+2 row, . . . .

Next, the basic operation of each unit pixel 10 is described in brief.

To begin with, a power supply voltage (VDD) is applied to the pixel power supply node PPN, thereby applying a bias voltage to the control gate of the current source transistor which is connected to the vertical signal line VSLa, VSLb. In this state, the reset transistor 14 is rendered conductive, thereby setting the voltage of the floating diffusion part 12 at VDD. Then, a current flows in a source follower circuit comprising the amplifying transistor 13 and the current source transistor, and a voltage of a value, which is shifted by a predetermined voltage from the voltage of the floating diffusion part 12, is output to the vertical signal line. Specifically, the read-out of reset voltage is executed. Then, the reset voltage is sampled by the correlated double sampling circuit in the column processing circuit.

After the reset voltage is sampled, the transfer transistor 13a or 13b is rendered conductive, and a signal charge accumulated in the photodiode 11b or 11a is read out to the floating diffusion part 12. The voltage of the floating diffusion part 12 is amplified by the amplifying transistor 15 and output to the vertical signal line (read-out of pixel signal voltage). Then, the pixel signal voltage is sampled by the correlated double sampling circuit. Thereafter, by taking a difference between the sampled reset voltage and pixel signal voltage, fixed pattern noise due to, e.g. a threshold variance of amplifying transistors 15 is eliminated. The difference signal is AD converted by the AD conversion circuit in the column processing circuit, and the resultant signal is output as a digital signal.

FIG. 2 is a timing chart illustrating an example of an operation in a case where read-out is executed by simultaneously selecting two rows of pixels in the pixel array 20 in FIG. 1 at a time of a global shutter operation which executes a shutter operation at an all-pixel simultaneous timing.

At the time of the global shutter operation, prior to the read operation from the pixels, reset pulse signals are output in advance from the resetting row scanning circuit 33 in the row scanning circuit 30 to all reset control lines RESETi. Thereby, as described above, all unit pixels 10 in the pixel array 20 are reset.

Next, read pulse signals are simultaneously output to two neighboring read control lines READi from the read-out row scanning circuit 31 in the row scanning circuit 30 for accessing pixels of odd-numbered columns and the read-out row scanning circuit 32 in the row scanning circuit 30 for accessing pixels of even-numbered columns. Subsequently, in the same timing sequence, pulse signals are simultaneously output to each two read control lines READi in succession. For example, if a read pulse signal is output to the read control line READ2, the transfer transistors 13b of the respective pixels in the even-numbered columns and in the M+1 row are rendered conductive, and the transfer transistors 13a of the pixels in the even-numbered columns and in the M+2 row are rendered conductive. Accordingly, signal charges accumulated in the photodiodes 11b and 11a are read out to the floating diffusion part 12, and read signals (Signal) are output to each two vertical signal lines VSLa (even) and VSLb (even).

At the same time as the read pulse signal is output to the read control line READ2, a pulse signal is also output to a read control line READ3. Thereby, the transfer transistors 13b of the respective pixels in the odd-numbered columns and in the M+2 row are rendered conductive, and the transfer transistors 13a of the pixels in the odd-numbered columns and in the M+3 row are rendered conductive. Accordingly, signal charges accumulated in the photodiodes 11b and 11a are read out to the floating diffusion part 12, and read signals (Signal) are output to each two vertical signal lines VSLa (odd) and VSLb (odd).

Subsequently, in a similar manner, pulse signals are simultaneously output to two neighboring read control lines READi from the read-out row scanning circuit 31 in the row scanning circuit 30 for accessing pixels of odd-numbered columns and the read-out row scanning circuit 32 in the row scanning circuit 30 for accessing pixels of even-numbered columns. In this case, the read-out row scanning circuit 31 for accessing pixels of odd-numbered columns and the read-out row scanning circuit 32 for accessing pixels of even-numbered columns execute such control to read the rows of pixels in every other row in the pixel array 20. Thereby, read signals (Signal) according to signal charges accumulated in the photodiodes 11b and 11a in the pixels in the even-numbered column and in the two rows are output to each two vertical signal lines VSLa (even) and VSLb (even). In addition, read signals (Signal) according to signal charges accumulated in the photodiodes 11b and 11a in the pixels in the odd-numbered column and in the two rows are successively output to each two vertical signal lines VSLa (odd) and VSLb (odd).

Figure 3:
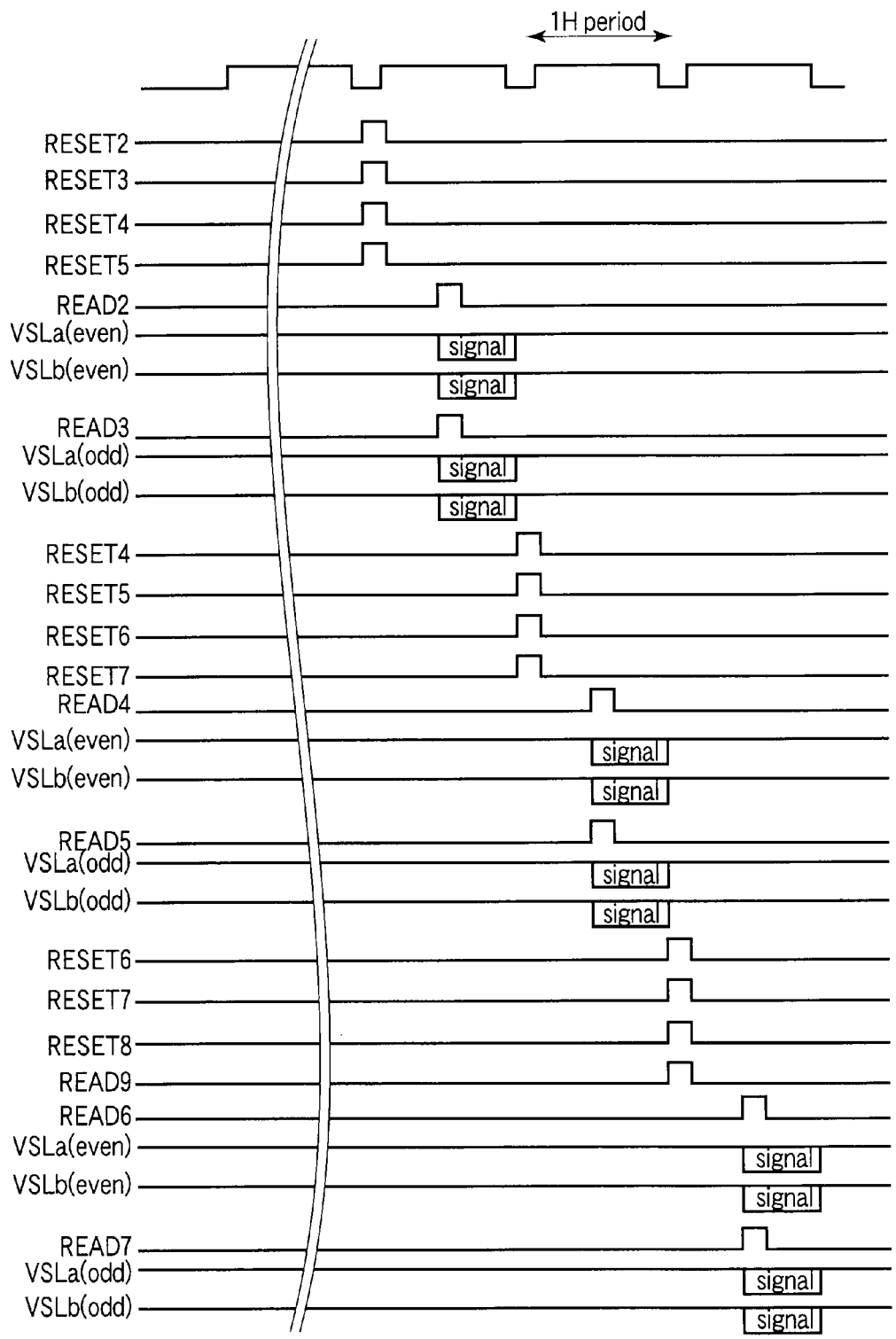
FIG. 3 is a timing chart illustrating an example of an operation in a case where read-out is executed by simultaneously selecting two rows of pixels in the pixel array in FIG. 1 at a time of a normal operation.

FIG. 3 is a timing chart illustrating an example of an operation in a case where read-out is executed by simultaneously selecting two rows of pixels in the pixel array 20 in FIG. 1 at a time of a normal operation. At the time of the global shutter operation, prior to the read operation from the pixels, reset pulse signals are output in advance to all reset control lines RESETi. However, at the time of the normal operation, unlike the global shutter operation, reset pulse signals are output to some reset control lines (four reset control lines in the embodiment) RESETi including reset control lines of two rows in which signal read is executed, before signals are read out in parallel from the photodiodes in the pixels of the two rows.

As has been described above, according to the CMOS image sensor of the first embodiment, at the time of the signal read operation, the row scanning circuit 30 outputs read pulse signals so as to simultaneously render conductive the two transfer transistors which are connected to two photodiodes of the four photodiodes in two pixels neighboring in the column direction, the two photodiodes neighboring between the pixels. Thereby, signals can be read out in parallel from the photodiodes in the pixels of two rows in the odd-numbered column and even-numbered column. Thus, the read time at the time of all-pixel read operation can be reduced, and the read time can be reduced to ½ of the normal frame rate.

Since the read-out system is divided into odd-numbered columns and even-numbered columns, the row scanning circuit 30 needs to be provided with the read-out row scanning circuit 31 for accessing pixels of odd-numbered columns and the read-out row scanning circuit 32 for accessing pixels of even-numbered columns. However, as regards the reset system, it should suffice to provide only one resetting row scanning circuit 33 which is common to the odd-numbered columns and even-numbered columns. Like the pixel access system, however, the reset system may be divided into odd-numbered columns and even-numbered columns, and two resetting row scanning circuits may be provided. In the first embodiment, the case has been described in which the unit pixel 10 does not include a select transistor. However, the embodiment is applicable to a case in which the unit pixel 10 includes a select transistor.

FIG. 4 is a block diagram illustrating the flow of read-out signals in the CMOS image sensor shown in FIG. 1, together with respective pixels in a case where two-row simultaneous read-out is executed, and column processing circuits which process signals which are read out from the respective pixels and are each transferred via two vertical signal lines VSLa and VSLb. In FIG. 4, the depiction of reset control lines RESETi is omitted. The column processing circuits are divided into first column processing circuits 50a which are provided on the upper side of the pixel array 20, and second column processing circuits 50b which are provided on the lower side of the pixel array 20.

For example, when read pulse signals are simultaneously output to read control lines READ2 and READ3, signals P1 of pixels indicated by hatching in FIG. 4, in which pixel sharing is implemented, and signals P2 of pixels indicated by fine dots in FIG. 4, in which pixel sharing is implemented, are read out at the same time. The read signal from the upper one of the two photodiodes of the pixels, in which pixel sharing is implemented, is sent to the first column processing circuit 50a via one of two vertical signal lines VSLa and VSLb, and the above-described process is executed. The read signal from the lower one of the two photodiodes of the pixels, in which pixel sharing is implemented, is sent to the second column processing circuit 50b via the other of two vertical signal lines VSLa and VSLb, and the above-described process is executed.

In the meantime, the read-out row scanning circuit 31 in the row scanning circuit 30 for accessing pixels of odd-numbered columns and the read-out row scanning circuit 32 in the row scanning circuit 30 for accessing pixels of even-numbered columns may be disposed such that their unit circuits for selecting the respective rows are displaced in every other row. In addition, the read-out row scanning circuit 31 in the row scanning circuit 32 for accessing pixels of odd-numbered columns and the read-out row scanning circuit 32 in the row scanning circuit 30 for accessing pixels of even-numbered columns execute control to read out signals in parallel from the photodiodes in the pixels of the odd-numbered columns and even-numbered columns in the same timing sequence. Thus, the timing signal can be sent from the pixel drive control circuit 40 to both circuits 31 and 32 in the same sequence. Therefore, the structure of the pixel drive control circuit 40 can be prevented from becoming complex, and the circuit area can be prevented from increasing.

FIG. 5 is a block diagram illustrating the flow of read-out signals in a CMOS image sensor according to a second embodiment, together with respective pixels in a case where two-row simultaneous read-out is executed, and column processing circuits which process signals which are read out from the respective pixels and are each transferred via two vertical signal lines VSLa and VSLb.

In the CMOS image sensor of the first embodiment, in each of the odd-numbered columns and even-numbered columns, the control gates of two transfer transistors 13a and 13b, which are connected to two photodiodes of the four photodiodes in two unit pixels 10 neighboring in the column direction, which two photodiodes neighbor between the pixels, are mutually connected.

On the other hand, in the CMOS image sensor according to the present embodiment, a pair of read control lines READia, READib (i=1, 2, 3, . . . ) are provided in association with each of the rows of the pixel array 20. The control gates of two transfer transistors 13a and 13b, which are connected to two photodiodes of the four photodiodes in two unit pixels 10 neighboring in the column direction, which two photodiodes neighbor between the pixels, are connected, respectively, to a pair of read control lines READia and READib in units of a row.

Further, the read-out row scanning circuit 31 in the row scanning circuit 30 for accessing pixels of odd-numbered columns and the read-out row scanning circuit 32 in the row scanning circuit 30 for accessing pixels of even-numbered columns are configured to drive each pair of read control lines READia and READib at the same timing. Specifically, the control gates of two transfer transistors, which are connected to two photodiodes of the four photodiodes in two unit pixels neighboring in the column direction of the pixel array 20, which two photodiodes neighbor between the pixels, are connected, respectively, to a pair of read control lines READia and READib, to which read pulse signals that have the same timing and are output from the read-out row scanning circuit 31 for accessing pixels of odd-numbered columns or the read-out row scanning circuit 32 for accessing pixels of even-numbered columns are transferred. In FIG. 5, a plurality of symbols x show connection points of pair of the read control lines READia and READib and the gates of the transfer transistors. By supplying read pulse signals from the read-out row scanning circuit 31 for accessing pixels of odd-numbered columns and the read-out row scanning circuit 32 for accessing pixels of even-numbered columns, to the pair of read control lines READia and READib at the same time, the transfer transistors are operated.

Although not shown in FIG. 5, a single reset control line RESETi is provided in association with each row, as in the case shown in FIG. 1.

In the second embodiment, compared to the first embodiment, the number of read control lines, which pass through the pixel array 20, is larger. However, when signals are read out of all pixels, it becomes possible to execute read by selecting rows one by one.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel array which includes a plurality of pixels associated with rows and columns,
wherein each of the pixels includes first and second photoelectric conversion elements and first and second transfer transistors associated with the first and second photoelectric conversion elements,
wherein in each of the pixels, the first and second transfer transistors share a floating diffusion portion, and
wherein pixels in even-numbered columns and pixels in odd-numbered columns are displaced by a half pitch in a column direction;
read control lines each of which connects the first transfer transistors to each other in two of the pixels adjacent in the column direction or the second transfer transistors to each other in two of the pixels adjacent in the column direction,
wherein the first and second transfer transistors which share the floating diffusion portion are connected to different ones of the read control lines, and
wherein the read control lines include first read control lines which connect commonly the pixels in the even-numbered columns and second read control lines which connect commonly the pixels in the odd-numbered columns; and
first and second signal lines associated with each column,
wherein the first and second signal lines connect floating diffusion portions of the associated pixels, and
wherein in each column, the pixels including floating diffusions connected to a first signal line are connected to different ones of the read control lines, and the pixels including floating diffusions connected to a second signal line are connected to different ones of the read control lines,
wherein in a read operation, one of the first read control lines and one of the second read control lines are selected to read out signals to the first and second signal lines in each column.

2. The device according to claim 1, wherein in each column, the pixels include first pixels connected to one of the first signal lines and second pixels connected to one of the second signal lines, and
the first and second pixels are arranged alternately.

3. The device according to claim 2, wherein in one of the even-numbered columns, first transfer transistors in first and second pixels which are adjacent along a first direction are connected to a first one of the first read control lines, and
second transfer transistors in first and second pixels which are adjacent along a second direction opposite to the first direction are connected to a second one of the first read control lines.

4. The device according to claim 3, wherein in one of the odd-numbered columns, first transfer transistors in first and second pixels which are adjacent along the first direction are connected to a first one of the second read control lines, and
second transfer transistors in first and second pixels which are adjacent along the second direction are connected to a second one of the second read control lines.

5. The device according to claim 1, wherein in two of the pixels adjacent in the column direction, both a first transfer transistor in one of the pixels and a second transfer transistor in other of the pixels are conducted simultaneously, thereby signals are read out in parallel to the associated first and second signal lines from the associated two photoelectric conversion elements of the pixels of two rows of an odd-numbered row and an even-numbered row.

6. The device according to claim 1, further comprising:
a first read-out row scanning circuit which selects one of the first read control lines; and
a second read-out row scanning circuit which selects one of the second read control lines,
wherein the first and second read-out row scanning circuit selects adjacent read control lines.

7. The device according to claim 6, wherein the first and second read control lines are arranged alternately in the pixel array, and
the first and second read-out row scanning circuits sequentially select the first and second read control lines.

8. The device according to claim 6, wherein the first read-out row scanning circuit and the second read-out row scanning circuit are configured to read out signals in parallel from the photoelectric conversion elements in the pixels of the odd-numbered column and the even-numbered column in the same timing sequence.

9. The device according to claim 1, wherein control gates of the two transfer transistors, which are connected to the two photoelectric conversion elements of the four photoelectric conversion elements in the two pixels neighboring in the column direction, which two photoelectric conversion elements neighbor between the pixels, are mutually connected.

10. The device according to claim 1, further comprising:
a plurality of reset lines connected to the pixels disposed in the plurality of rows; and
a reset circuit configured to supply reset signals to the plurality of reset lines.

11. The device according to claim 10, wherein the reset circuit is configured to supply the reset signals to all of the plurality of reset lines, prior to a read operation, when a global shutter operation is executed.

12. The device according to claim 10, wherein the reset circuit is configured to supply, at a time of a normal operation of reading signals from pixels included in two neighboring rows, the reset signals to the plurality of reset lines including two reset lines corresponding to the two neighboring rows.

* * * * *